(12) United States Patent
Sharma et al.

(10) Patent No.: US 11,687,536 B2
(45) Date of Patent: Jun. 27, 2023

(54) PIPELINE-BASED SYSTEM FOR CONFIGURATION CHECKING AND REPORTING ASSOCIATED WITH AN INFORMATION PROCESSING SYSTEM

(71) Applicant: EMC IP Holding Company LLC, Hopkinton, MA (US)

(72) Inventors: Anurag Sharma, Cedar Park, TX (US); Sujayendra Thammaiah, Ashland, MA (US); Christopher Trudel, Georgetown, TX (US); John Moran, Mebane, NC (US); Ramesh Ramanathan, Plano, TX (US); Ranjini Gogga, Bangalore (IN); Sunil Bhaskarnaidu, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 388 days.

(21) Appl. No.: 17/070,288

(22) Filed: Oct. 14, 2020

(65) Prior Publication Data
US 2022/0114184 A1      Apr. 14, 2022

(51) Int. Cl.
*G06F 16/24*       (2019.01)
*G06F 16/2457*    (2019.01)
(Continued)

(52) U.S. Cl.
CPC ........ *G06F 16/24575* (2019.01); *G06F 9/382* (2013.01); *G06F 9/44505* (2013.01); *G06F 9/5027* (2013.01); *G06F 16/24573* (2019.01)

(58) Field of Classification Search
CPC ......... G06F 16/24575; G06F 16/24573; G06F 9/382
See application file for complete search history.

(56) References Cited

U.S. PATENT DOCUMENTS 5,381,539 A   1/1995 Yanai et al.
5,551,003 A   8/1996 Mattson et al.
(Continued)

FOREIGN PATENT DOCUMENTS

WO  PCT/US2019/024885   1/2020
WO  PCT/US2019/024900   1/2020

OTHER PUBLICATIONS

Dell EMC, "Dell EMC VxRack Flex," Dell EMC Product Overview, 2018, 5 pages.
(Continued)

*Primary Examiner* — Loc Tran
(74) *Attorney, Agent, or Firm* — Ryan, Mason & Lewis, LLP (57) ABSTRACT

Pipeline-based techniques for system configuration management are provided. For example, a method comprises, in a pipeline-based system comprising a set of one or more pipelines, for a given one of the set of one or more pipelines, collecting a set of one or more configuration datasets respectively associated with a set of one or more elements of an information processing system, wherein each of the configuration datasets of the collected set of one or more configuration datasets is specific to the respective element of the information processing system from which it is collected; executing a set of one or more configuration checks on the set of one or more configuration datasets; receiving a set of one or more output results from the executed one or more configuration checks; and generating at least one report from the one or more output results.

20 Claims, 7 Drawing Sheets

(51) Int. Cl.
*G06F 9/445* (2018.01)
*G06F 9/38* (2018.01)
*G06F 9/50* (2006.01)

(56) References Cited

U.S. PATENT DOCUMENTS

| | | | |
|---|---|---|---|
| 5,764,880 | A | 6/1998 | Gerdt et al. |
| 6,052,799 | A | 4/2000 | Li et al. |
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,652,403 | B2 * | 5/2020 | Matunog ............ H04N 1/00323 |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2019/0312933 | A1 * | 10/2019 | Richards ............. H04L 67/1097 |
| 2021/0326736 | A1 * | 10/2021 | Kishimoto ........... G06K 9/6227 |
| 2022/0228217 | A1 * | 7/2022 | Cheishvili ............. G16B 40/20 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006. 1598129, pp. 200-211.
Wikipedia, "Raft (Computer Science)," https://en.wikipedia.org/wiki/Raft_(computer_science), Feb. 10, 2020, 4 pages.
Wikipedia, "Paxos (ComputerScience)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Project Jupyter, "Jupyter Conference," https://jupyter.org/, Oct. 6, 2020, 11 pages.
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/807,709 filed in the name of Avi Puder et al. filed Mar. 3, 2020, and entitled "Management of Shared Resources in a Software-Defined Storage Environment."
U.S. Appl. No. 16/822,818 filed in the name of Itay Keller et al. filed Mar. 18, 2020, and entitled "Storage System Implementing Snapshot Longevity Ranking for Efficient Management of Snapshots."
U.S. Appl. No. 16/822,848 filed in the name of Itay Keller et al. filed Mar. 18, 2020, and entitled "Assignment of Longevity Ranking Values of Storage Volume Snapshots Based on Snapshot Policies."
U.S. Appl. No. 16/823,813 filed in the name of Itay Keller et al. filed Mar. 19, 2020, and entitled "Managing Incompressible Data in a Compression-Enabled Log-Structured Array Storage System."
U.S. Appl. No. 16/830,469 filed in the name of Roi Tagar et al. filed Mar. 26, 2020, and entitled "Storage Block Balancing Using Volume Part Migration."
U.S. Appl. No. 16/830,473 filed in the name of Yugal Peleg Lieblich et al. filed Mar. 26, 2020, and entitled "Replicated State Cluster with Standby Node State Assessment During Leadership Transition."
U.S. Appl. No. 16/830,946 filed in the name of Gil Ben Zeev et al. filed Mar. 26, 2020, and entitled "Storage Volume Migration Scheduling Based on Storage Volume Priorities and Specified Constraints."
U.S. Appl. No. 16/832,763 filed in the name of Michal Yarimi et al. filed Mar. 27, 2020, and entitled "Managing Storage Device Errors During Processing of Inflight Input/Output Requests."
U.S. Appl. No. 16/834,363 filed in the name of Itay Keller et al. filed Mar. 30, 2020, and entitled "Managing Least Recently Used Cache Using Reduced Memory Footprint Sequence Container."
U.S. Appl. No. 16/836,824 filed in the name of Itay Keller et al. filed Mar. 31, 2020, and entitled "Management of Volume Snapshots in a Data Storage System."
U.S. Appl. No. 16/888,742 filed in the name of Rivka Matosevich et al. filed May 31, 2020, and entitled "Balancing Resiliency and Performance by Selective Use of Degraded Writes and Spare Capacity in Storage Systems."
U.S. Appl. No. 16/918,654 filed in the name of Rivka Matosevich et al. filed Jul. 1, 2020, and entitled "Sharing Memory Resources Between Asynchronous Replication Workloads."
U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."
U.S. Appl. No. 17/024,912 filed in the name of Anurag Sharma et al. filed Sep. 18, 2020, and entitled "Automatic Discovery and Configuration of Server Nodes."
U.S. Appl. No. 17/065,754 filed in the name of Dan Aharoni et al. filed Oct. 8, 2020, and entitled "Direct Response to IO Request in Storage System with Remote Replication."
U.S. Appl. No. 17/070,073 filed in the name of Dan Aharoni et al. filed Oct. 14, 2020, and entitled "Direct Response to IO Request in Storage System Having an Intermediary Target Apparatus."

* cited by examiner

| Group | Check ID | Check Name | Component | Status |
|---|---|---|---|---|
| FlexOS Array | VXFM0001 | Cluster State is not Normal | System-1 | Yes |
| FlexOS Array | VXFM0002 | Slave MDMs with a status not equal to normal | System-1 | Yes |
| FlexOS Array | VXFM0003 | SDS registered IP address count does not equal 2 | System-1 | Yes |
| FlexOS Array | VXFM0004 | SDS with a state not equal to Connected | System-1 | Yes |
| Vmware | VXFM0005 | Claim of SDCs has duplicated GUID and number of SDCs could not be verified | System-1 | Yes |
| Nexus 3k and Nexus 9k | VXFM0036 | Switch running-config doesn't match startup-config. Run Command show running-config diff to see changes | Nexus 3k | Yes |
| Juniper/Arista/Cisco FlexOS Nodes and Nexus Switches | VXFM0037 | SDS interfaces have incorrectly configured MTU sizes | NG1 | No |
| Disks | VXFM0038 | SMART error supported | WXN-001 | Yes |
| Disks | VXFM0039 | LED identification supported | WXN-002 | No |
| ... | ... | ... | ... | ... |

PIPELINE-BASED SYSTEM FOR CONFIGURATION CHECKING AND REPORTING ASSOCIATED WITH AN INFORMATION PROCESSING SYSTEM

FIELD

The field relates generally to information processing systems, and more particularly to configuration checking and reporting in information processing systems.

BACKGROUND

Monitoring and managing the operational health of an information processing system such as, by way of example, a hardware component, an equipment rack, an appliance, a software component, or even a data center itself, is an important part of system configuration management. However, current solutions are cumbersome for customers and/or support engineers and lack flexibility to adapt for system configuration changes.

SUMMARY

Illustrative embodiments provide a pipeline-based technique for system configuration management.

For example, in one illustrative embodiment, a method comprises, in a pipeline-based system comprising a set of one or more pipelines, for a given one of the set of one or more pipelines, collecting a set of one or more configuration datasets respectively associated with a set of one or more elements of an information processing system, wherein each of the configuration datasets of the collected set of one or more configuration datasets is specific to the respective element of the information processing system from which it is collected; executing a set of one or more configuration checks on the set of one or more configuration datasets; receiving a set of one or more output results from the executed one or more configuration checks; and generating at least one report from the one or more output results.

Further illustrative embodiments are provided in the form of non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide a configuration check pipeline and methodology to execute system configuration checks and generate reports using commands combined with system utilities to enhance system configuration management capabilities.

These and other features and advantages of embodiments described herein will become more apparent from the accompanying drawings and the following detailed description.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center (or part thereof) or other cloud-based system (or part thereof) that includes one or more clouds hosting multiple tenants that share cloud resources. Numerous different types of enterprise computing and storage systems are also encompassed by the term "information processing system" as that term is broadly used herein.

It is realized herein that the overall health of an information processing system such as, by way of example, an equipment rack, a hardware component, an appliance, a software component, or even a data center including a software-defined storage system, requires ensuring that best practices are applied and that critical issues are remediated.

Illustrative embodiments provide a configuration check pipeline methodology that executes system configuration checks and generates reports using commands combined with system utilities to enhance system configuration management capabilities. For example, as shown in an operational environment 100 in FIG. 1, an information processing system 102 is operatively coupled to a pipeline system configuration checking and reporting engine 104 according to an illustrative embodiment. As will be further explained, in one or more illustrative embodiments, pipeline system configuration checking and reporting engine 104 is configured to validate the configuration of information processing system 102 (or parts thereof) based on best practices to avoid data unavailability and data loss for the information processing system 102.

Figure 1:
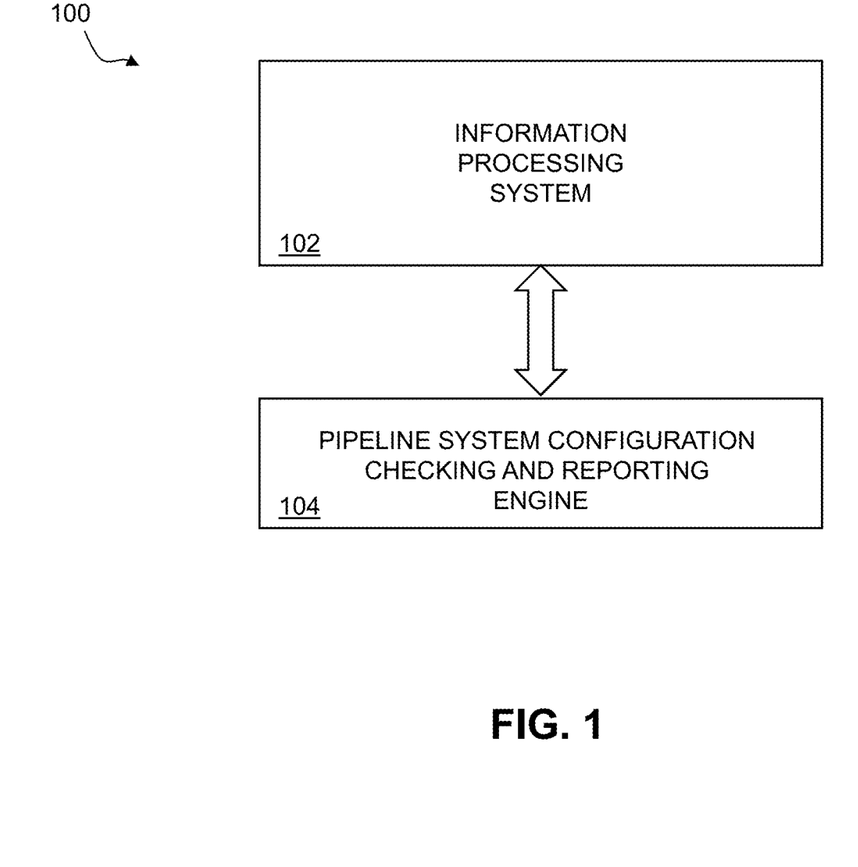
FIG. 1 illustrates an information processing system operatively coupled to a pipeline system configuration checking and reporting engine according to an illustrative embodiment.

A non-limiting set of use case examples for which pipeline system configuration checking and reporting engine 104 can provide configuration checking and reporting with respect to information processing system 102 includes: pre-qualification of hardware components and capabilities as part of a data center readiness review; post install verification of best practices by field engineers; inspection of best practices by support engineers assigned to solve customer issues; proactive monitoring of overall health of the system; brownfield adoption to learn the existing configuration before deployment/migration; and cluster expansion. In information technology (IT), a brownfield deployment is an installation and configuration of new hardware or software that needs to or otherwise should coexist with legacy IT systems (in contrast, a greenfield deployment is an installation and configuration of new hardware or software that is not dependent on legacy IT systems).

Challenges within these illustrative use cases are realized to exist. For example, support engineers follow documentation to perform installation and remediation but still require a systematic way to validate their work against best practices before leaving the customer site. Also, not every support/field engineer is equal in technical competency. Further, most major releases of an information processing system come with an opinionated configuration of an engineered solution. These and other challenges render existing configuration tools difficult, ineffective or otherwise lacking in some manner.

Figure 2:
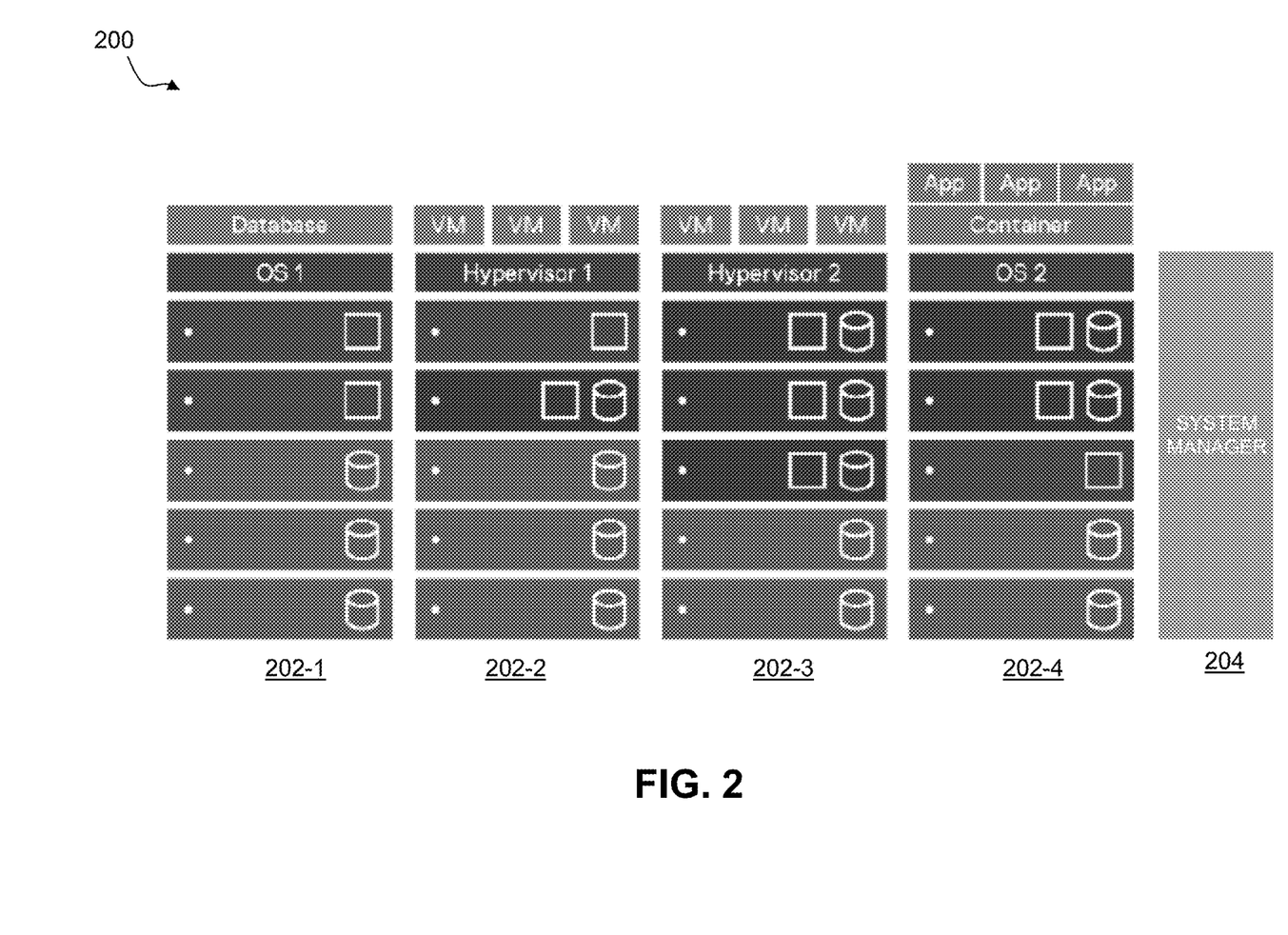
FIG. 2 illustrates an example of an information processing system in the form of a software-defined, scalable storage and compute system with which one or more illustrative embodiments may be implemented.

FIG. 2 illustrates an example of an information processing system 200 in the form of a software-defined, scalable storage and compute system with which one or more illustrative embodiments may be implemented. It is to be understood that pipeline system configuration checking and reporting functionalities described herein are not limited to use with information processing system 200.

More particularly, information processing system 200 depicts a set of equipment racks 202-1, 202-2, 202-3 and 202-4. Each equipment rack 202 is configured with a set of resources including one or more of compute resources (represented by a square symbol), storage resources (represented by a disk symbol), combination resources (represented by square and disk symbols), and others (e.g., networking resources not shown expressly shown). The set of equipment racks are managed by a system manager 204 to enable configuration of the rack and its resources to support an on-demand execution environment to host systems such as a database and its operating system, sets of virtual machines (VMs) and their hypervisors, and a container and its operating system to execute a set of application programs (Apps). By way of example only, the set of equipment racks 202-1, 202-2, 202-3 and 202-4 can be part of a data center. One example of such a set of equipment racks and a system manager that comprise information processing system 200 is the VxFlex® or PowerFlex® (commercially available from Dell EMC, Hopkinton Mass.) integrated rack system. The VxFlex® or PowerFlex® integrated rack is a flexible hyperconverged infrastructure (HCI) rack-scale system with integrated networking that supports heterogeneous IT environments. HCI enables compute, storage and networking functions to be decoupled from the underlying infrastructure and run on a common set of resources including industry standard compute, storage and networking components, e.g., deployed within the set of equipment racks 202-1, 202-2, 202-3 and 202-4.

In some illustrative embodiments, pipeline system configuration checking and reporting engine 104 is implemented in part or in whole within system manager 204. In alternative embodiments, pipeline system configuration checking and reporting engine 104 is implemented in part or in whole outside system manager 204.

Figure 3:
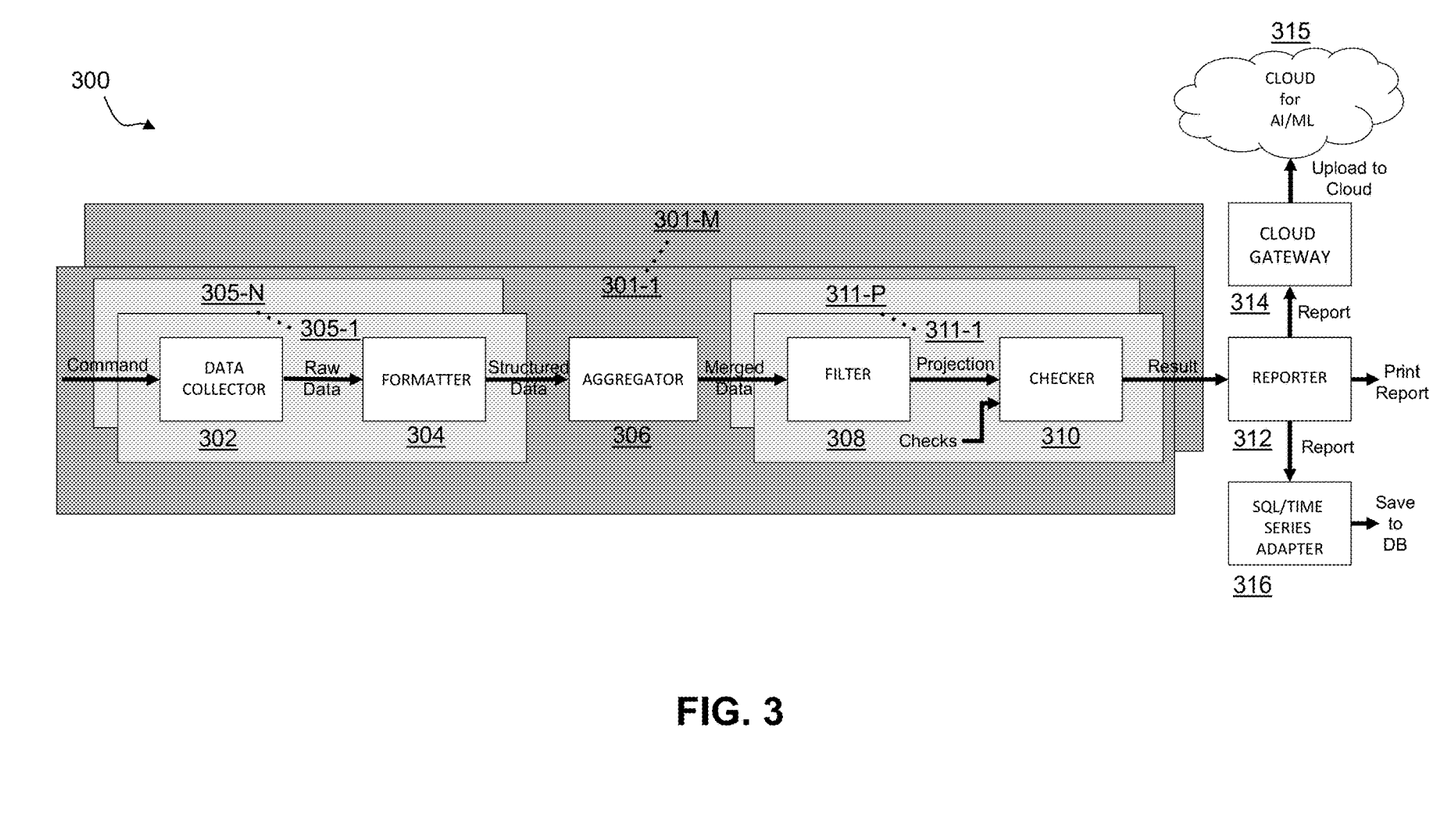
FIG. 3 illustrates a pipeline system configuration checking and reporting engine according to an illustrative embodiment.
Figure 4:
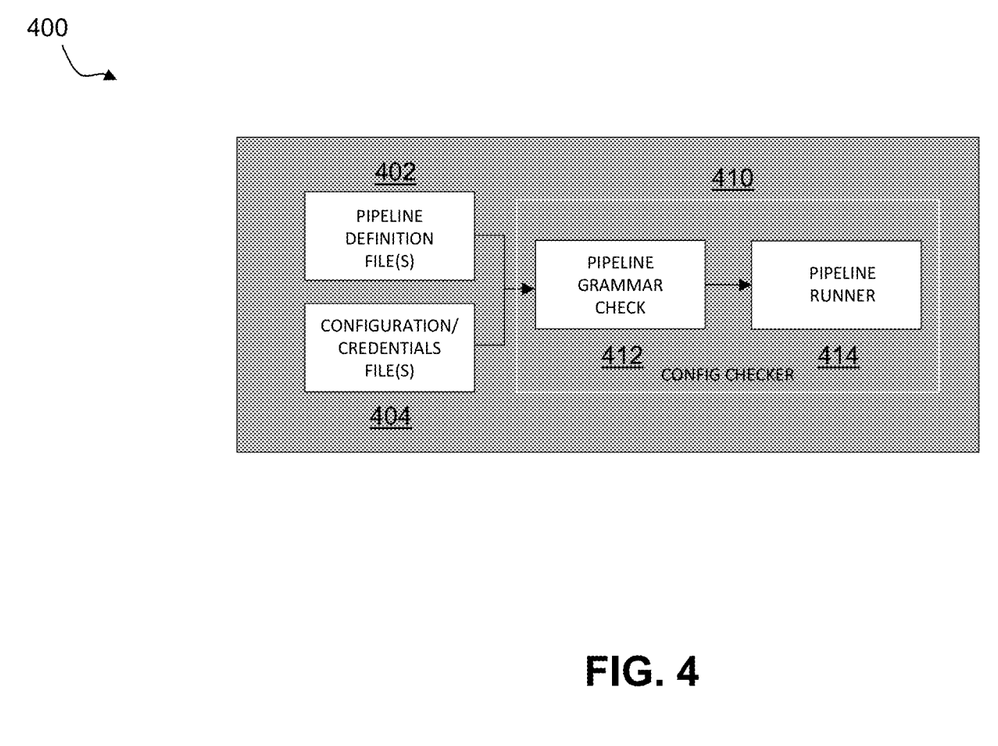
FIG. 4 illustrates an installation and execution environment of a pipeline system configuration checking and reporting engine according to an illustrative embodiment.

FIGS. 3 and 4 illustrate a pipeline system configuration checking and reporting engine and corresponding environment according to an illustrative embodiment. The elements depicted in FIGS. 3 and 4 are part of an illustrative embodiment of the pipeline system configuration checking and reporting engine 104 of FIG. 1. (and as mentioned above, in some illustrative embodiments, may be implemented in part or in whole in system manager 204 of FIG. 2).

As mentioned above, illustrative embodiments provide configuration check pipelines to build system configuration checks and generate reports using commands combined with system utilities to enhance system configuration management capabilities. FIG. 3 illustrates a definition of a example pipeline system 300 comprising several components, according to illustrative embodiments, as will be further explained below.

Note that pipeline system 300 depicts a plurality of pipelines 301-1 through 301-M, wherein M represents the number of pipelines generated for a given configuration checking use case. Thus, it is understood that components 302 through 310 (or a subset thereof), as are shown in pipeline 301-1 and as will be described below, are also present in each other pipeline that is generated (e.g., M pipelines).

Data collector 302 is configured to collect data from the information processing system (e.g., 200) with which the pipeline system configuration checking and reporting engine is operatively coupled. In illustrative embodiments, data collector 302 is at least one of multiple types of collectors. By way of example only, data collector 302 is a structured query language (SQL) collector or a time series collector to query data from an existing database, e.g., see database implemented in equipment rack 202-1 of FIG. 2. Further, in some illustrative embodiments, data collector 302 is a HyperText Transport Protocol (HTTP) collector to invoke a Representational State Transfer (REST) application programming interface (API) to obtain live (i.e., real-time) data from switches/servers of the information processing system, e.g., as may be deployed in one or more of the set of equipment racks 202-1, 202-2, 202-3 and 202-4 of FIG. 2. Still further, in some illustrative embodiments, data collector 302 is an Ansible (Redhat) collector to execute a playbook for a complex task to deploy operating system (OS) tools on hosts and execute commands to generate data. Ansible is an open-source software provisioning, configuration management, and application-deployment tool enabling infrastructure as code. In some embodiments, data collector 302 comprises multiple ones of the data collectors mentioned above. Alternative embodiments are not limited to any particular individual or set of data collectors.

Formatter 304 is configured to leverage operating system and open source utilities such as the utilities of the information processing system (e.g., system 200) from which data collector 302 collects raw data. In some illustrative embodiments, formatter 304 comprises a JQ functionality. JQ is a lightweight and flexible command-line JavaScript Object Notation (JSON) processor that enables slicing, filtering, mapping and transforming of raw data into structured data sets. Other data transformation tools other than JQ can be used alternatively or additionally in other embodiments, e.g., SED, CURL, etc.

Note that in the illustrative embodiment of FIG. 3, as depicted by the cascaded blocks 305-1 through 305-N surrounding data collector 302 and formatter 304, there are a series of N data collectors in a given pipeline, one for each device (e.g., OS, switch, etc.) being monitored in the information processing system, and each of which generates data in a device specific format (e.g., json, xml, text output etc.). Thus, there are also a series of N formatters used to respectively transform device specific data into a more structured format (e.g., tabular format with rows and columns) so that the other components of pipeline can more easily/consistently process the data. N can be the number of different configuration resources being monitored by pipeline 301-1 (in some cases the resources may be homogeneous and other cases they may be heterogeneous).

The component of the pipeline following the different sets of data collector/formatter, i.e., aggregator 306, is singular and is configured to cross join, as needed, two or more data sets received from two or more formatters (304) using a standard data merge operation. Assume in one use case, there are two data collectors (302), a TOR switch collector and a spine/leaf switch collector. The aggregator 306 joins formatted data from the two switches to provide a holistic view to checker 310. The checker rules are defined across the switches, e.g., to ensure that a jumbo frame (e.g., maximum transmission unit or MTU) is set up correctly in all switches for a virtual local area network (VLAN). By way of example only, see check #VXFM00007 in table 500 of FIG. 5 where it is assumed that data is collected from nodes, vCenter and switches to ensure that the correct MTU is set at the network interface all the way from host to the virtual switch at vCenter to the TOR switch. Note that MTU is the size of the largest protocol data unit (PDU) that can be communicated in a single network layer transaction. Other examples of aggregation that can be performed by aggregator 306 include, but are not limited to, aggregating hardware inventory from a set of nodes and then checking if all nodes have a consistent setting.

Filter 308 receives merged data from aggregator 306 and is configured to select parts of the merged data as needed. For example, when the merged data is part of a database table, filter 308 is configurable to select one or more rows and/or one or more columns of the database table based on some predefined conditions. Furthermore, filter 308 (which may be one of multiple filters in pipeline 301-1 as will be explained below) is used to pick one or more specific attributes on which a check rule can be applied. For example, a data collector for a disk drive's SMART attributes produces ten rows, one for each disk, with columns such as Read Error Rate, Throughput Performance, Power on Hours, etc. Filter 308 can therefore be configured to select disk0 and attributes Read Error Rate and Throughput Performance. Checker 310 then compares the value disk0 [Read Error Rate]<10% and disk0[Throughput Performance]>90%.

Checker 310 is configured to check for conditions with logical groupings, and conditions applied to the data to produce yes/no/nil output. Thus, checker 310, in some illustrative embodiments, represents multiple checkers configured to check various conditions. This is depicted in FIG. 3 by the cascaded blocks 311-1 through 311-P surrounding filter 308 and checker 310. More particularly, in some embodiments of pipeline 301-1, there are a series of P filters and P checkers. Recall the example above with regard to a check for disk SMART attributes. Projection, as shown in FIG. 3 as an output of filter 308 and an input of checker 310, represents selection of a few columns and all rows from a table, i.e., a vertical slice of a table. For instance, aggregator 306 may produce a large number of columns but checker 310 is configured to only check a few select columns based on the use case. In some embodiments, checker 310 can use an index to select a specific row.

Reporter 312 is configured to aggregate outputs from each checker (310) of each pipeline (301-1 through 301-M) to create one or more reports. By way of example only, a given checker 310 may be configured to generate a comma-separated values (CSV) report. A comma-separated values file is a delimited text file that uses a comma to separate values, wherein each line of the file is a data record and each record consists of one or more fields separated by commas. Reporter 312 aggregates the multiple CSV reports. Thus, advantageously, results from multiple pipelines are aggregated by reporter 312 which can then either persist an individual report or an aggregated report in a database or send it to a cloud platform 315 via a cloud gateway 314 for artificial intelligence/machine learning (AI/ML) processing as further explained below. Note also that a report saved into a local database can be used in another pipeline (e.g., one of pipelines 301-M) by an SQL data collector, thus allowing for processing of data in multiple phases.

In one non-limiting example, the cloud platform 315 can be a backend enterprise server. For example, cloud gateway 314 uploads one or more reports to the backend server which implements CloudIQ® (commercially available from Dell EMC, Hopkinton Mass.), a cloud-based application that implements intelligent and predictive analytics to proactively monitor the health of one or more storage systems (e.g., one or more of equipment racks 202-1, 202-2, 202-3 and 202-4 of FIG. 2). The backend server (cloud platform 315) can implement other analytics on the one or more uploaded reports such as, but not limited to, InsideIQ® and DataIQ® (commercially available from Dell EMC, Hopkinton Mass.), as well as other analytics based on artificial intelligence/machine learning (AWL).

Adapter 316 is configured for SQL and/or time series data. For example, adapter 316 as an SQL adapter is configured to persist report data to a relational database management system (RDBMS) database. Likewise, when adapter 316 is configured as a time series adapter, report data is persisted to a time series database and can be plotted using visualization tools such as, but not limited to, Grafana. Furthermore, such data provided by an adapter 316 can be used by another pipeline configured as shown in FIG. 3. Thus, in illustrative embodiments, a first pipeline (e.g., 301-1) can serve as input to at least a second pipeline (e.g., 301-2 and/or others of the pipelines 301), and so on (e.g., meaning that the at least a second pipeline can provide input to yet another one or more pipelines).

Furthermore, in some illustrative embodiments, one or more of the components of pipeline system 300 are configured to comprise the following features:

(i) Each component can be a command line utility which reads from standard input and writes to standard output.

(ii) Components can be mixed with standard OS commands or open source utilities such as JQ, SED, CURL, etc.

(iii) Each component can come with manual pages and inline command line interface (CLI) help. Manual (or man) page is a Linux OS term. Each command in Linux OS provides a short help function as part of the command switch, e.g., "$ command-name—help". The full manual page for a command can be retrieved with manual command "$ man command-name".

(iv) Depending on the use case, each component can be optional and component ordering (i.e., sequencing in the pipeline) is not restricted.

(v) Data collectors can include caching options.

(vi) Checks performed by checkers can be conditional expressions with logical groupings using AND/OR operators.

(vii) User-friendly grammar can be employed to script flexible pipelines intuitively.

(viii) An OS job scheduler can be leveraged to execute pipelines periodically.

(ix) One or more components can be embedded as part of an application such as PowerFlex® Manager (Dell EMC, Hopkinton Mass.) which can run on system manager 204 of FIG. 2.

In some embodiments, components of pipeline system 300 are configured to employ individual commands which may comprise (note that the name associated with a command below corresponds to the component with the same or similar name shown in FIG. 3, i.e., data collector, aggregator, etc.):

(i) [Data Collector Name]—command "collector supported command"—cache true/false—context "output var name"—u "config.user"—p "config.pwd"—h "config.host"

(ii) [Aggregator]—join [Context1] [Context2]—context "output var name"

(iii) [Filter]—select attr1 attr2 . . . —condition attr3=value3—context "output var name"

(iv) [Checker]—groupName "identifier"—checkId "Id"—checkName "identifier"—componentName attr6—condition "(row[0].attr1=value1 and row[1].attr2=value2)∥(row[2].attr3=value3 and row[3].attr3=value3)"—context "output var name"

(v) [Reporter]—join [Context1] [Context2] . . . —format CSV∣JSON—out cloud∣SQL∣TSDB∣stdout.

When pipeline system 300 uses Linux shell pipes of standard input and output, commands and features may comprise the following (note that the name associated with a command below corresponds to the component with the same or similar name shown in FIG. 3, i.e., data collector, aggregator, etc.):

(i) [Data Collector Name]—command "collector supported command"—context "output var name"∣[Aggregator]—join [Context1] [Context2] . . . —context "output var name"∣[Filter]—command "select attr1, attr2 from [Context3] where attr3=value3"—context "output var name" ∣[Checker]—groupName "identifier"—checkName "identifier"—condition "(row[0].attr1=value1 and row[1].attr2=value2)∥(row[2].attr3=value3 and row[2].attr3=value3)"—context "output var name"∣[Reporter]—join [Context1] [Context2]—format CSV∣JSON—out SRS∣SQL∣TSDB. In Linux OS and also as illustratively described herein, a pipeline is a mechanism for inter-process communication using message passing. For example, a pipeline is a set of processes chained together by their standard streams, so that the output text of each process is passed directly as input to the next one. The message passing functionalities are achieved using commands as in the Linux examples herein. Note that the vertical bar symbol between two commands is called a pipe and instructs the shell to use the output of the command on the left of the symbol as the input to the command on the right of the symbol. In illustrative embodiments as illustrated above, an output of a component in the pipeline is saved in a user-defined context variable to allow referencing it in other components as input.

(ii) Ability to mix and match with OS shell utilities or open source shell utilities;

(iii) Ability to create connected pipelines, e.g., one pipeline saves data into a database in phase-I and another pipeline reads from the database to perform phase-II checks.

(iv) Ability to run the pipeline using ConfigChecker CLI—inline or from a file: $ configchecker—pipeline hci-checks-pipeline.txt or pipeline.txt. Help—$ [component]—help OR $ man [component], $ configchecker—version-∣help.

FIG. 4 illustrates an installation and execution environment 400 of the pipeline system 300 of FIG. 3, i.e., pipeline system configuration checking and reporting engine 104 of FIG. 1, wherein the engine is installed with components such as a set of pipelines, the configuration required for the engine itself to run, and then the part of the engine for validating the pipeline and running the pipeline. More particularly, environment 400 depicts a set of pipeline.txt file(s) 402 developed for the product or support engineer. More pipeline files can be inserted into this file folder. These files 402 represent the different pipeline implementations (definitions) of pipeline system 300.

The environment 400 also includes configuration/credentials file(s) 404 to provide credentials and uniform resource locators (URLs) for cloud gateways (e.g., 314) and databases that reporter 312 will use to upload or persist data. Configuration/credentials file(s) 404 can also include credentials required by data collectors (e.g., 302) in a next stage or phase. Configuration/credentials file(s) 404 can be edited before executing the pipeline system 300 via pipeline runner 414. Pipeline grammar check 412 is used to check syntax of pipeline.txt files before executing them in pipeline runner 414 (collectively depicted by block 410). In case of a syntax error, pipeline runner 414 terminates with errors highlighting filename, line # and column to point to the error. Thus, it is to be understood that pipeline definition file(s) 402 in FIG. 4 is pipeline system configuration checking and reporting engine 104 from FIG. 1 (pipeline system 300 from FIG. 3) saved as a script, i.e., one or more pipeline.txt files. Note that the pipeline system configuration checking and reporting engine 104 (pipeline system 300) may be implemented using Linux Shell pipes, although alternative implementations are contemplated to be within the scope of other embodiments.

Figure 5:
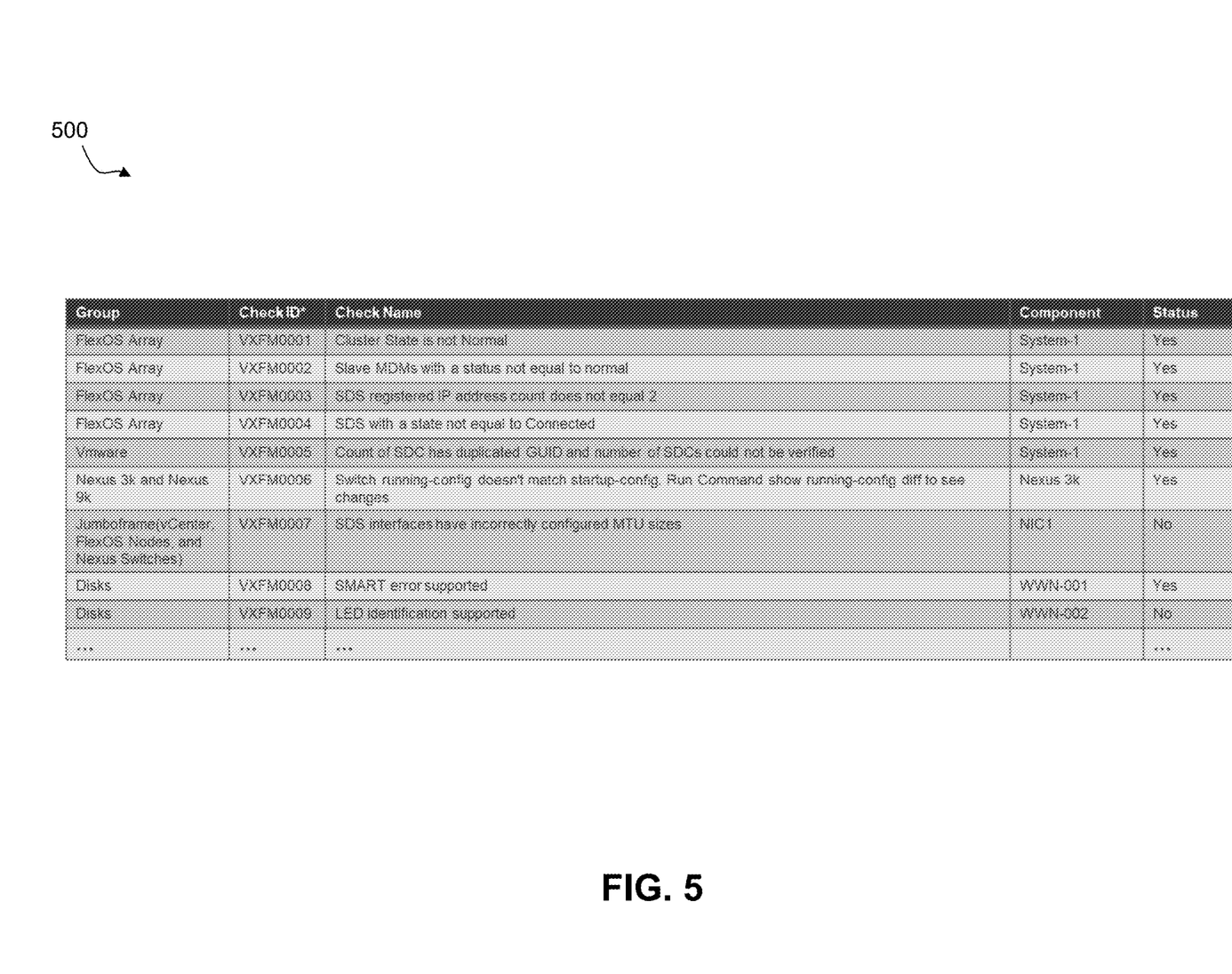
FIG. 5 illustrates an example of a configuration check report according to an illustrative embodiment.

FIG. 5 illustrates a sample configuration check report in table 500 as may be generated by reporter 312 of FIG. 3. Note that domain specific pre-defined checkID passed to [checker] command helps automated systems to act on this report to remediate the issue or alert a user through visualization/SNMP/email. For example, the system manager (204 of FIG. 2) may maintain a visual representation of a network, servers, etc. and can use checkID to map an error to specific pixels in the graphics or highlight the connected arrows using a given color.

Illustrative embodiments provide many advantages, for example:

(i) The configuration check pipeline system enables support engineers to build system configuration checks and generate reports using Linux shell like commands combined with existing OS utilities to enhance the capabilities without waiting for code changes from an engineering team.

(ii) The system environment is agnostic and scalable to any project or business domain.

(iii) The system environment can be integrated with a database to create connected flexible pipelines.

(iv) User-friendly pipeline grammar and ability to test components such as any other Linux shell utility are available.

(v) The system environment can be integrated with a cloud gateway to upload the report to a cloud platform for execution of AI/ML analytics.

(vi) The system environment is lightweight, reusable and ability for embedding into management and orchestration (M&O) applications, visualization applications such as Grafana, and future-task scheduling applications such as Linux cron jobs. A cron job is a task executed on a user's system by a cron daemon (a built-in Linux utility) at a scheduled time. The cron daemon reads a crontab (from a cron table) for predefined commands and scripts. By using a specific syntax, a cron job can be configured to schedule scripts or other commands to run automatically.

(vii) A non-limited number of data collectors can be implemented to address a relatively large percentage (e.g., about 90%) of possible use cases and limitations using a combination of OS Shell utilities.

(viii) The system environment enables saving an output of a component in a user-defined context variable to allow referencing it in other components as input.

Furthermore, in illustrative embodiments, pipeline system 300 runs on a Linux OS and includes collectors pre-built specifically to computer/network infrastructure of the information processing system which is being managed. Generation, installation and execution of a pipeline definition according to illustrative embodiments does not require knowledge of any programming language. Commands in pipeline system 300 can be developed from existing Linux OS commands which do not require programming.

Figure 6:
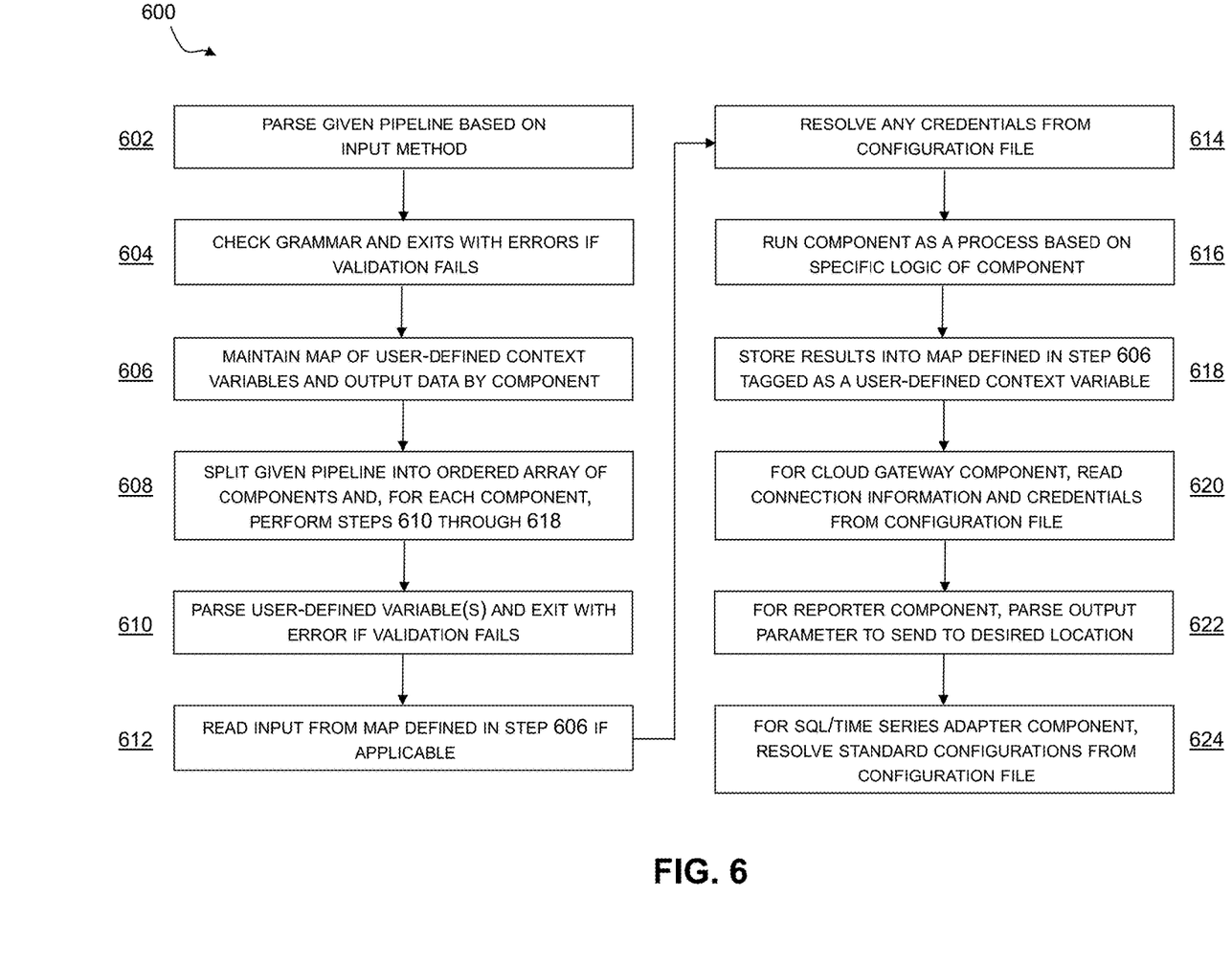
FIG. 6 illustrates a pipeline system configuration checking and reporting methodology according to an illustrative embodiment.

FIG. 6 illustrates a pipeline system configuration checking and reporting methodology 600 according to an illustrative embodiment. It is to be appreciated that the methodology 600 can be executed by pipeline system configuration checking and reporting engine 104 of FIG. 1 to perform configuration checking of information processing system 102.

In step 602, methodology 600 parses a given one of the pipelines (as illustratively described herein) either from a command line or from a user file, based on the input method.

In step 604, methodology 600 checks grammar and exits with errors if validation fails.

In step 606, methodology 600 maintains a map of user-defined context variable(s) and output data by components.

In step 608, methodology 600 splits the given pipeline into an ordered array of components and, for each component, perform steps 610 through 618.

In step 610, methodology 600 parses the user-defined context variable(s) (note that if validation fails, the methodology stops).

In step 612, methodology 600 reads input(s) from the map defined in step 606 (i.e., standard input(s), if applicable).

In step 614, methodology 600 resolves any credentials from the configuration file (as explained above).

In step 616, methodology 600 uses the OS system executor (e.g., Linux OS shell) to run the component as a process (defined by the specific logic of the component) passing input via standard input.

In step 618, methodology 600 stores results of the component execution into the map defined in step 606 tagged as a user-defined context variable (if applicable), for example, write the output to a standard output.

Note that methodology 600 in step 620, for a cloud gateway (e.g., 314 in FIG. 3), reads connection information, set-user identifier (SUID) and other credentials from the configuration file. For a reporter (e.g., 312 in FIG. 3), in step 622, methodology 600 parses the output parameter to send output to the desired location(s). For the SQL and time series adapters (e.g., 316 in FIG. 3), methodology 600 in step 624 resolves the standard configurations from the configuration file. In illustrative embodiments, OS utilities are executed with standard input and output, and Ansible components are executed using an Ansible playbook runner and output is captured.

Figure 7:
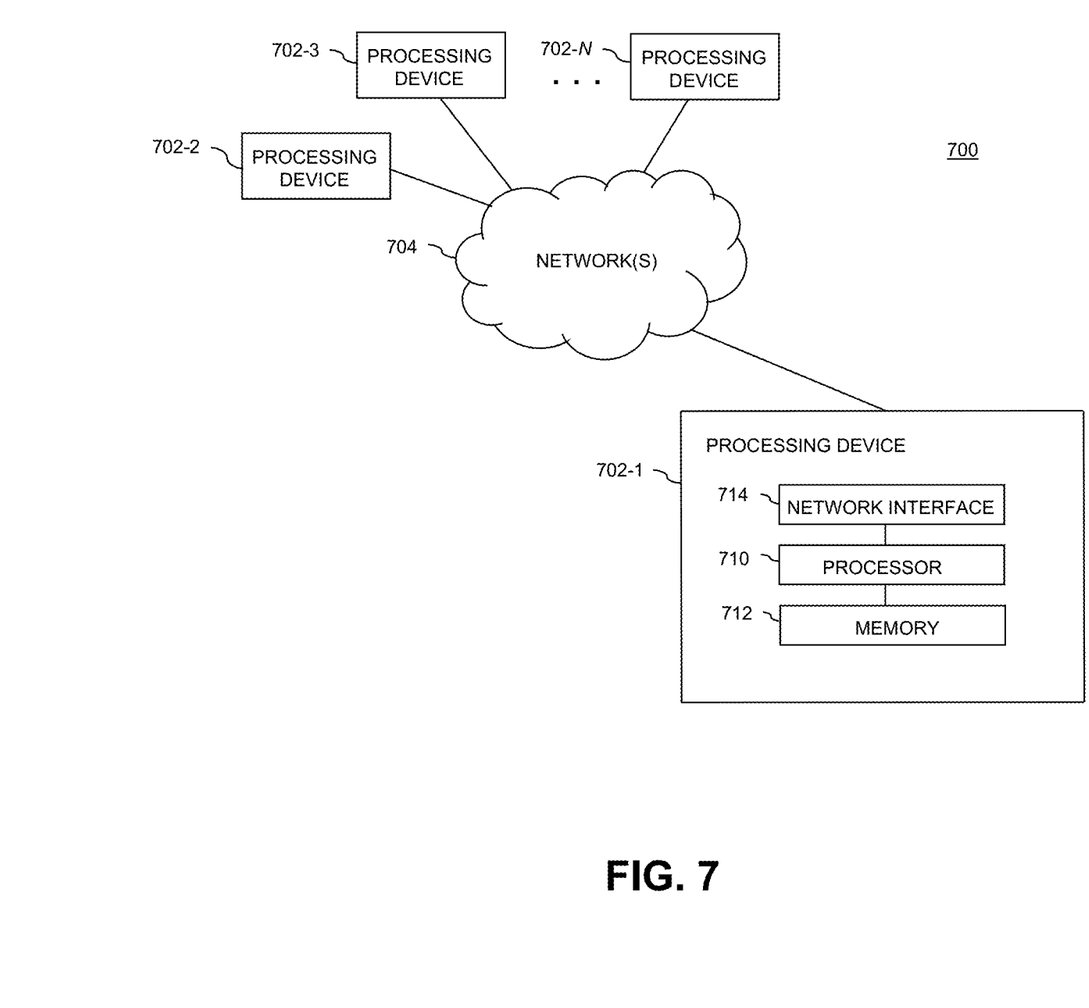
FIG. 7 illustrates a processing platform used to implement an information processing system with pipeline system configuration checking and reporting functionalities according to an illustrative embodiment.

FIG. 7 depicts a processing platform 700 used to implement system configuration management according to an illustrative embodiment. More particularly, processing platform 700 is a processing platform on which a computing environment with functionalities described herein (e.g., FIGS. 1-6 and otherwise described herein) can be implemented.

The processing platform 700 in this embodiment comprises a plurality of processing devices, denoted 702-1, 702-2, 702-3, . . . 702-N, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, ... 702-N) of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
   at least one processing device comprising a processor coupled to a memory;
   the at least one processing device, when executing program code, implements a pipeline-based system comprising a set of one or more pipelines, wherein a given one of the set of one or more pipelines is configured to implement operatively-coupled components comprising:
   a set of one or more data collector components configured to collect a set of one or more configuration datasets respectively associated with a set of one or more elements of an information processing system being configuration-checked, wherein each of the configuration datasets of the collected set of one or more configuration datasets is specific to the respective element of the information processing system from which it is collected;
   a set of one or more checker components configured to respectively execute a set of one or more configuration checks on the set of one or more configuration datasets;
   a set of one or more filter components configured to respectively select one or more portions of the one or more configuration datasets such that the set of one or more checker components execute the set of one or more configuration checks on the selected one or more portions; and
   a reporter configured to receive a set of one or more output results from the set of one or more checker components and to generate at least one report; and
   wherein the set of one or more checker components is further configured to check grammar associated with one or more definitions of the given one of the set of one or more pipelines, wherein the checking comprises:
   determining whether there are one or more syntax errors in one or more scripts corresponding to the one or more definitions; and
   identifying, in response to determining the one or more syntax errors, one or more locations in the one or more scripts corresponding to the one or more of the syntax errors.

2. The apparatus of claim 1, further comprising a set of one or more formatter components configured to respectively transform the set of one or more configuration datasets into a set of one or more structured configuration datasets.

3. The apparatus of claim 1, further comprising an aggregator component configured to aggregate at least a portion of the set of one or more configuration datasets.

4. The apparatus of claim 1, further comprising a gateway component for providing at least a portion of the at least one report to a cloud platform for analysis.

5. The apparatus of claim 1, further comprising a database adapter component for providing at least a portion of the at least one report to a database for storage.

6. The apparatus of claim 1, wherein a given one of the operatively coupled components is configured to save an output in a context variable, wherein the context variable enables referencing of the output by another given one of the operatively coupled components as an input.

7. The apparatus of claim 1, wherein an output of the given one of the set of one or more pipelines serves as an input to at least another given one of the set of one or more pipelines.

8. The apparatus of claim 1, wherein the set of one or more elements of the information processing system being configuration-checked comprise at least one of a compute resource, a storage resource, and a networking resource deployed in the information processing system.

9. A method comprising:
in a pipeline-based system comprising a set of one or more pipelines, for a given one of the set of one or more pipelines:
collecting a set of one or more configuration datasets respectively associated with a set of one or more elements of an information processing system, wherein each of the configuration datasets of the collected set of one or more configuration datasets is specific to the respective element of the information processing system from which it is collected;
executing a set of one or more configuration checks on the set of one or more configuration datasets;
selecting one or more portions of the one or more configuration datasets and executing the set of one or more configuration checks on the selected one or more portions;
receiving a set of one or more output results from the executed set of one or more configuration checks;
generating at least one report from the one or more output results; and
checking grammar associated with one or more definitions of the given one of the set of one or more pipelines, wherein the checking comprises;
determining whether there are one or more syntax errors in one or more scripts corresponding to the one or more definitions; and
identifying, in response to determining the one or more syntax errors, one or more locations in the one or more scripts corresponding to the one or more of the syntax errors;
wherein the steps are performed by at least one processing device comprising a processor coupled to a memory when executing program code.

10. The method of claim 9, further comprising transforming the set of one or more configuration datasets into a set of one or more structured configuration datasets.

11. The method of claim 9, further comprising aggregating at least a portion of the set of one or more configuration datasets.

12. The method of claim 9, further comprising providing at least a portion of the at least one report to a cloud platform for analysis.

13. The method of claim 9, further comprising providing at least a portion of the at least one report to a database for storage.

14. A computer program product comprising a non-transitory processor-readable storage medium having stored therein program code of one or more software programs, wherein the program code when executed by the at least one processing device causes the at least one processing device to perform the steps of claim 9.

15. A method comprising:
in a pipeline-based system comprising a set of one or more pipelines configured to collect a set of one or more configuration datasets respectively associated with a set of one or more elements of an information processing system and to configuration-check the set of one or more elements:
parsing a given one of the pipelines;
checking grammar associated with a definition of the given one of the pipelines, wherein the checking comprises:
determining whether there are one or more syntax errors in one or more scripts corresponding to the definition; and
identifying, in response to determining the one or more syntax errors, one or more locations in the one or more scripts corresponding to the one or more of the syntax errors;
maintaining a map of one or more context variables and output data of the given one of the pipelines; and
separating the given one of the pipelines into an ordered array of components to:
execute a set of one or more configuration checks on the set of one or more configuration datasets;
select one or more portions of the one or more configuration datasets and execute the set of one or more configuration checks on the selected one or more portions;
obtain a set of one or more output results; and
generate at least one report;
wherein the steps are performed by at least one processing device comprising a processor coupled to a memory when executing program code.

16. The method of claim 15, further comprising, for a given component:
parsing one or more user-defined context variables;
reading one or more inputs from the map;
executing the given component as a process based on the one or more inputs; and
storing output results of the component execution into the map.

17. The method of claim 16, further comprising generating a report based on at least a portion of the output results.

18. The method of claim 17, further comprising providing the report to one or more of a cloud platform for analysis and a database for storage.

19. The method of claim 9, wherein an output of the given one of the set of one or more pipelines serves as an input to at least another given one of the set of one or more pipelines.

20. The method of claim 9, wherein the set of one or more elements of the information processing system comprise at least one of a compute resource, a storage resource, and a networking resource deployed in the information processing system.

* * * * *